Figure 1:
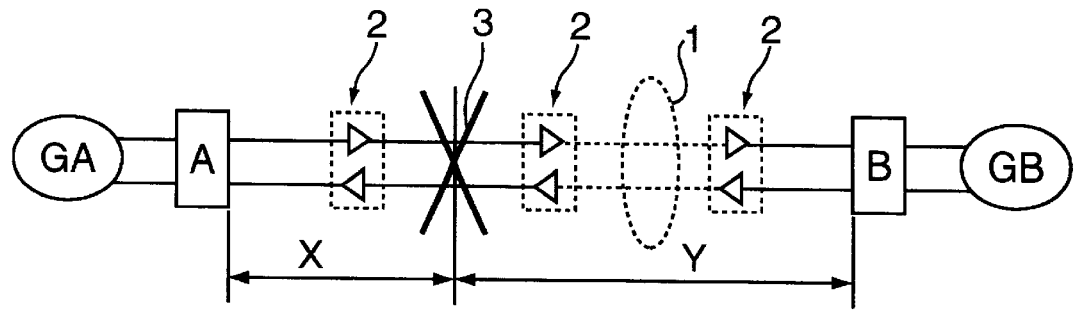

United States Patent
Trommel

[11] Patent Number: 5,991,338
[45] Date of Patent: Nov. 23, 1999

[54] PINPOINTING INTERRUPTIONS

[75] Inventor: Eric Simon Trommel, Zoetermeer, Netherlands

[73] Assignee: Koninklijke PTT Nederland N.V., Netherlands

[21] Appl. No.: 08/950,397

[22] Filed: Oct. 14, 1997

[30] Foreign Application Priority Data

Oct. 21, 1996 [NL] Netherlands ............ 1004325

[51] Int. Cl.⁶ .............. H04B 3/46; H04B 17/00; G01R 31/08
[52] U.S. Cl. .............. 375/224; 324/532; 324/535; 455/67.1
[58] Field of Search ............ 375/224, 228; 324/532, 535, 527, 512, 522, 523, 528; 455/67.1, 67.4

[56] References Cited

U.S. PATENT DOCUMENTS

| | | | |
|---|---|---|---|
| 5,184,081 | 2/1993 | Oswald et al. | 324/532 |
| 5,206,595 | 4/1993 | Wiggins et al. | 324/532 |
| 5,416,418 | 5/1995 | Maureira et al. | 324/532 |
| 5,682,100 | 10/1997 | Rossi et al. | 324/535 |

FOREIGN PATENT DOCUMENTS 60-176336  9/1985  Japan .
4-37321    2/1992  Japan .

*Primary Examiner*—Stephen Chin
*Assistant Examiner*—Albert Park
*Attorney, Agent, or Firm*—Michaelson & Wallace; Peter L. Michaelson

[57] ABSTRACT

The invention relates to a method for pinpointing an interruption in a link for transmitting digital signals between a first station and a second station on the basis of the times of occurrence of signal changes on the link. In accordance with the invention, the method is characterised by generating signal changes after the link has been restored. Preferably, the time of restoration is determined on the basis of data signals received, and a detection signal is fed to the link after the determination of the time of restoration. On the basis of the difference in time of observing restoration and of receiving a detection signal, the location of the interruption is determined. For this purpose, the length of the link need not be known.

14 Claims, 1 Drawing Sheet

PINPOINTING INTERRUPTIONS

A. BACKGROUND OF THE INVENTION

The invention relates to a method for pinpointing temporary interruptions in links, such as communication links, for transmitting digital signals, a device for implementing the method, and a system and communications network in which the method is used.

More in particular, the invention relates to a method for pinpointing a temporary interruption in a link between a first station and a second station on either side of the link, based on the points in time at which signal changes on the link reach the stations. In particular, the distance of said stations to the point where the interruption has occurred is determined in this manner. Below, the term "interruption", as used in this disclosur, designates the cause of the signal changes, even if no complete interruption is involved here—i.e., no complete loss of a signal transmitted over the link—or if the interruption is only momentary.

Many of the (temporary) interruptions in communication links arise during maintenance or management activities. There may be thought of, e.g., a temporary rerouting of a link, or of a (momentary) withdrawal of a printed-circuit board in an amplifier station. For attributing the responsibility for the failure caused in the information traffic by the interruption, it is of importance to determine where the interruption took place.

Admittedly, in the Japanese patent application JP-A-4-37321 [ref. 1] there is disclosed a method to determine the location of an interruption on the basis of the propagation delay of signal changes. In the event of said known method, however, a signal change specifically consists of the (substantial) loss of a carrier wave or information signal on the link, and said loss will generally be the direct result of an interruption, or at any rate a failure, in the link. The method is based on determining the difference in the time of occurrence of a change in the analogue signal value, determined on either side of the link. Use is made of the fact that on the analogue transmission path in question there is a signal which in the event of an interruption occurring in said transmission path is completely or substantially lost. The point in time of such loss of a signal cannot be determined exactly with simple means, although such should in fact be done on either side of the link in order to be capable of determining the difference with sufficient exactness. When digital signals are transmitted by way of the transmission path, special provisions should be installed to derive a signal from the digital signals which, in the event of an interruption in the link, undergoes such a characteristic change as in the known method. In addition, in the event of the known irethod, measured values, namely, times of occurrence of changes in the signal value between stations on either side of the link, must be exchanged and compared to one another. This is possible only by way of another link between the stations existing at that moment, or after restoration of the link on the basis of relatively inaccurate measured values determined earlier. Moreover, for determining the location of the interruption, the overall length of the link, designated by L in JP-A-4-37321, must be known.

B. SUMMARY OF THE INVENTION

The object of the invention is to provide a method for pinpointing interruptions in links for transmitting digital signals, which is not only very reliable, but in which there need not be exchanged, between the stations, measured values depending on the location of the interruption, and the length of the link need not be known.

Another object of the invention is to provide a method for pinpointing interruptions in links, which makes it possible to determine the location of the interruption in each of the stations separately, so that it is possible to check the determination of the location.

An additional object of the invention is to provide a method for pinpointing interruptions in links which makes it possible to measure the length of the link or to check it, as the case may be.

According to the invention, these and other objects are achieved with a method of the type referred to in the preamble of claim 1, characterised by generating signal changes after the link has been restored.

In a preferred embodiment of the method according to the invention, the time of restoration is determined on the basis of data signals received.

In a further embodiment of the method, a detection signal is fed to the link after the time of restoration of the link has been determined. Said feeding of a detection signal may take place with due observance of a certain delay; in this case, the delay time should be decided in advance. The detection signal preferably consists of a data signal having a characteristic pattern of zeros and ones, not inherent to the data to be transmitted.

C. REFERENCE

[1] JP-A-4-37321 Cable Fault Point Locating System.

D. BRIEF DESCRIPTION OF THE DRAWING

Figure 2:
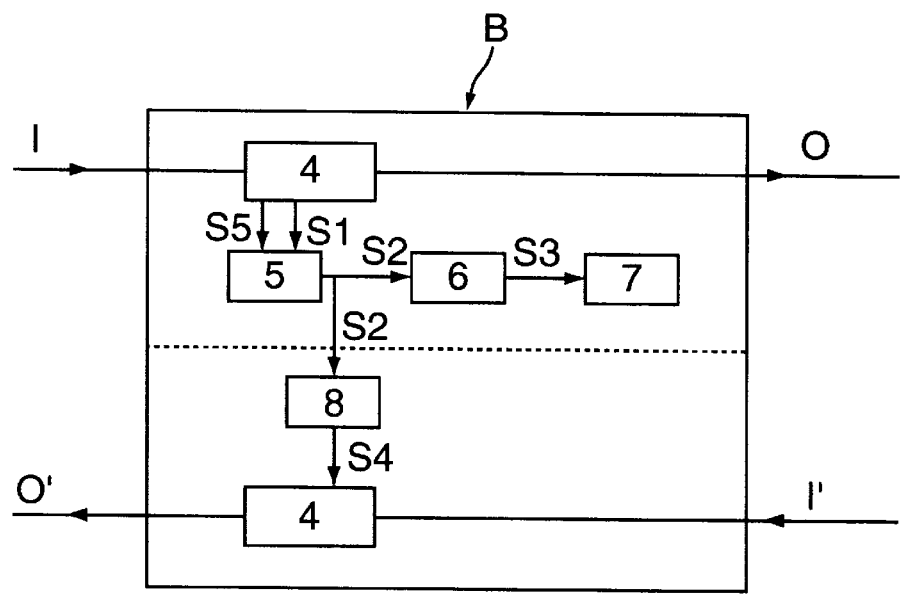
Figure 3:
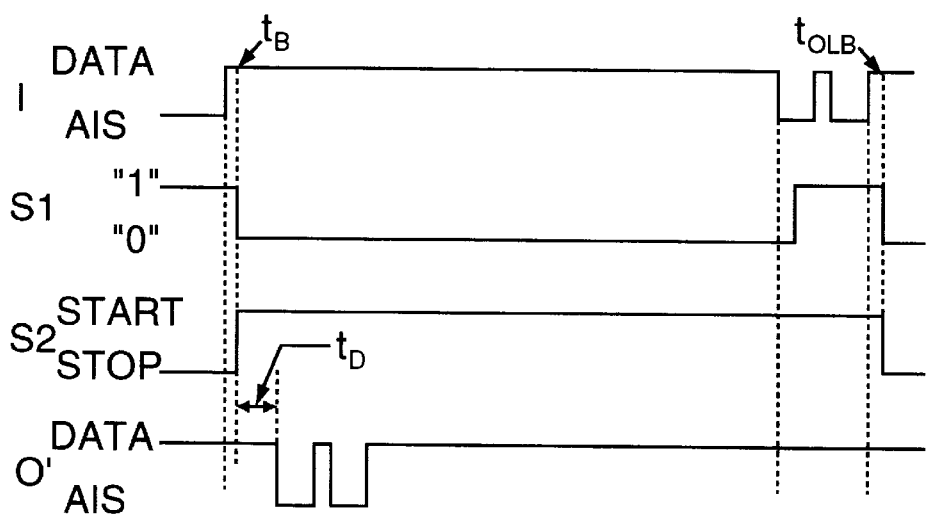

The invention will be explained in greater detail by means of a description of an exemplary embodiment, reference being made to a drawing in which:

FIG. 1 schematically shows a link, such as a communication link for transmitting digital signals, having stations on either side, designated by A and B, respectively;

FIG. 2 schematically shows a possible embodiment of a station;

FIG. 3 shows a time diagram for the relevant signals.

E. DESCRIPTION OF AN EXEMPLARY EMBODIMENT

In FIG. 1, (1) is a duplex communication link including intermediary stations (2), while on either side of the link (1) there are located stations A and B. The intermediary stations customary in such communication links comprise amplifier units. In this case, there are drawn three intermediary stations, but this number is just an example. The users of the link are designated by GA and GB. The location of the interruption, which may be pinpointed by the method to be described, is designated by (3). The distance of the interruption (3) to station A is called to X, the distance to station B is called Y. Of course, the location of an interruption indicated in FIG. 1 is only one of the possible locations. Another possible location is a location between an intermediary station and one of the stations A and B.

It is customary that, in the event of observing, in an intermediary station (2), an interruption in the transmission path, there is transmitted an "Alarm Indication Signal" (AIS) in the direction of the ends of the link. Thus, in the situation shown in FIG. 1, the intermediary post to the left of the interruption (3) transmits an AIS in the direction of station A, and the intermediary station to the right of the interruption (3) transmits an AIS in the direction of station B. Such an AIS consists of a sequence of substantially ones. In response thereto, the stations A and B set a flag Q; in other words, to a signal Q there is assigned the digital value "1".

In the method according to the invention, the restoration of the link is awaited to determine the location of the interruption. As a result of the finite transmission speed of signals, some time after said restoration there are once again received, in the stations A and B, signals or data containing information, originating from the users GB and GA. Generally, the times of observing restoration of the link will differ from one another for the stations A and B; only when the delay times of signals from the point of the interruption to the stations A and B are equal, the restoration-observation times, hereinafter designated by $t_A$ and $t_B$ respectively, will be equal. If it is assumed that restoration of the link takes place at the time $t_0$, the following applies:

$$t_A = t_0 + t_X,$$

where $t_X$ designates the period of time required for the propagation of a signal over a distance X from the point of the interruption to the station A.

Thus, the following likewise applies:

$$t_B = t_0 + t_Y.$$

At the times $t_A$ and $t_B$, clocks are started in station A and station B, respectively. Then there is transmitted, after a predetermined delay $t_D$, by stations A and B, a momentarily characteristic pattern of zeros and ones, preferably a pseudo-AIS having substantially ones. In either station, there is then awaited the receipt of the momentary pseudo-AIS from the other side. At the time of receipt of said pseudo-AIS, all data for pinpointing interruptions is available. At that point in time, in the station A or station B, respectively, the signal Q is given the digital value "0". If the times of receipt of the momentary AIS for the stations A and B is designated by $T_{OLA}$ and $t_{OLB}$, respectively, the following applies:

$$t_{OLA} = t_0 + t_Y + t_D + t_{X+Y}$$

and:

$$t_{OLB} = t_0 + t_X + t_D + t_{X+Y}.$$

In station A, the difference between $t_A$ and $t_{OLA}$ is determined; in station B, the difference between $t_B$ and $t_{OLB}$. Thus, for station A said measured value $t_{mA}$ is found as:

$$\begin{aligned} t_{mA} &= t_{0LA} - t_A \\ &= t_0 + t_Y + t_D + t_{X+Y} - t_0 - t_X \\ &= t_Y + t_D + t_{X+Y} - t_X \\ &= 2 \cdot t_Y + t_D, \end{aligned}$$

where it has been assumed that the delay time of a signal over part of the link is directly proportional to the length of said part of the link.

Likewise, the following applies to station B:

$$\begin{aligned} t_{mB} &= t_{0LB} - t_B \\ &= 2 \cdot t_X + t_D. \end{aligned}$$

From the measured value $t_{mA}$ found in station A, there may therefore be derived—Since $t_D$ is known—the time required by a signal to pass through the distance from the point of the interruption to station B. Making use of the fact that the speed, with which signals are propagated over the link, is known, the distance from the interruption to station B may be determined from $t_{mA}$. Likewise, the distance from the interruption to station A may be determined from the measured value $t_{mB}$ found in station B. All this without having to know the overall length of the link. In fact, the overall length of the link may even be derived from a summation of measured values in the stations A and B.

In FIG. 2, showing a possible embodiment of a station (in this case station B of FIG. 1), (I) and (O) are the input and output signals of the receiving side of station B, and (I') and (O') are the input and output signals of the transmission side of station B. The components referred to in the description of FIG. 2 also figure in station A. In this embodiment, there are applied "CEPT (E1) line cards", designated by (4) and (4') in FIG. 2. [CEPT=Conférence Européenne des administrations des Postes et des Télécommunications] Such a card, hereinafter designated, for briefness' sake, by "CEPT card", is available from, inter alia, the firm Dallas: the DS2284. The CEPT card (4) generates a signal S1, "receive AIS", which has the logical value "1" when at the input I there have been received, during a certain period of time, almost exclusively ones. With a signal S2, derived from S1 by interruption-deciding circuit (5) in a way still to be described, a clock (6) is started and stopped. The signal S3 represents the measured value for the period of time between starting and stopping the clock (6), and is presented by result display (7) in the form of a number corresponding to the size of the distance from station B to the location of the interruption. CEPT card (4') has an input for a signal S4; when S4 has the logical value "1", CEPT card (4') transmits a series of ones by way of output O'. This serves as a pseudo-AIS for station A. The signal S4 is derived from S2 by pattern generator (8) in such a manner that CEPT card (4'), under control of S4, transmits a specific pattern of pseudo-AIS, alternated with data, on O'. Said pattern may consist of, e.g.: a short-time pseudo-AIS, (almost) exclusively ones, followed by data, and closed off by another short-time pseudo-AIS. In the pseudo-AIS pattern, there may possibly be included a characteristic pattern of zeros. Such a unique, and for stations A and B identical, AIS/data pattern (detection signal), if it is transmitted by station B, is recognised by the interruption-deciding circuit (5) in station A and converted into a stop signal for the clock (6) present in station A. Using a unique pattern for the detection signal has the advantage that a quick alteration of the decision is avoided, such as when a control circuit is provided with hysteresis. From the above it follows that S2 must be given the start value (the value at which clock (6) is started) when S1 passes from a logical "1" to a logical "0" to indicate that the end of the interruption has been observed. As already mentioned earlier, the signal S2 must receive the stop value (the value at which clock (6) is stopped) when the unique pattern of AIS and data—the detection signal—is recognised.

In the above it is assumed that the interruption to be pinpointed is located between two intermediary stations, and therefore, e.g., at location (3) in FIG. 1. Should the interruption occur on the segment between the nearest intermediary station and station B, and therefore when there is no longer any intermediary station between the interruption and station B, then station B will receive no AIS. In this case, the interruption is observed since station B observes that there is no longer any signal: "carrier loss". The CEPT card (4) reports this by means of the signal S5 (RCL, "Receive Carrier Loss") which then assumes the logical value "1". To be capable of pinpointing such an interruption, not only must S2 be given the start value when S1 passes from a logical "1" to a logical "0", but also when S5 is given the logical value "1". In summary, it may be said that the interruption-deciding circuit (5) takes a decision on the grounds of a number of criteria whose values for S1 and S2 are referred to. Apart from this, in a specific case still other, implementation-dependent, criteria may be taken into consideration, such as the period duration of signals.

FIG. 3 offers a time diagram for some of the relevant signals in the event that the interruption is located between two intermediary stations. Here, it may be seen that at the time $t_B$, corresponding, with a slight difference, to the point in time on which data is again received after an interruption, S1 passes from "1" to "0" and then represents the unique pattern transmitted from station A. Signal S2—the start/stop signal for the clock—assumes the start value when S1 passes from "1" to "0",and the stop value after recognition of the unique pattern transmitted by station A. The data originating from the user B is passed on to O', with the exception of the period during which station B is transmitting the unique pattern, to start at the moment $t_B + t_D$.

It will be understood by those skilled in the art that the invention is not limited to the embodiments shown, and that many modifications and amendments are possible without departing from the scope of the invention.

I claim:

1. A method for pinpointing a temporary interruption in a link that extends between a first station and a second station, the temporary interruption limits transmission of signals between the first station and the second station over the link, the method comprising the steps of:

awaiting a restoration of the link in the first station and in the second station, the restoration indicated by digital signals being transmitted between the first station and the second station following said temporary interruption;

observing the restoration of the link in the first station;

observing the restoration of the link in the second station;

generating a change signal in the first station a predetermined time after the restoration of the link is observed in the first station in response to the observed restoration of the link in the first station;

transmitting the change signal from the first station to the second station over said link;

receiving the change signal in the second station; and determining the distance between the interruption and the second station based upon the time that the restored link was observed at the second station, and based upon the time that the change signal was received at the second station.

2. The method set forth in claim 1, further comprising the steps of:

generating a second change signal in the second station a predetermined time after the restoration of the link is observed in the second station in response to the observed restoration of the link in the second station;

transmitting the second change signal from the second station to the first station over said link;

receiving the second change signal in the first station; and determining the distance between the interruption and the first station based upon the time that the restored link was observed at the first station, and based upon the time that the change signal was received at the first station.

3. An apparatus for pinpointing a temporary interruption in a link extending between a first station and a second station, the apparatus comprising:

the first station including a first indication portion, a first detection portion, and a first measured-value portion, the first indication portion receiving a first indication signal over the link from the second station, the first detection portion indicatives restoration of the link after the temporary interruption, the first detection portion also generate a first detection signal to be transmitted onto the link in response to the first indication signal, the first measured-value portion generating a first measured-value signal to be received by the second station;

the second station including a second indication portion, a second detection portion, and a second measured-value portion, the second indication portion receiving a second indication signal over the link from the first station, the second detection portion indicatives restoration of the link after the temporary interruption, the second detection portion also generates a second detection signal to be transmitted onto the link in response to the second indication signal, the second measured-value portion generating a second measured-value signal to the first station; and the first station receiving the second measured-value signal and determining the distance between the location of the temporary interruption and the first station in response to the first indication signal and in response to the second measured-value signal generated by the second station.

4. The apparatus as set forth in claim 3, wherein the first station determines the distance between the first station and the temporary interruption in response to a time that the second detection portion indicates restoration of the link, and in response to a time that the first measured-value portion receives the second detection signal transmitted over the link by the second detection portion.

5. The apparatus as set forth in claim 3, further comprising:

the second station receiving the first measured-value signal and determining the distance between the location of the temporary interruption and the second station in response to the second indication signal and in response to the first measured-value signal generated by the first station.

6. The apparatus as set forth in claim 5, wherein the second station determines the distance between the second station and the temporary interruption in response to a time that the first detection portion indicates restoration of the link, and in response to a time that the second measured-value portion receives the first detection signal transmitted over the link by the first detection portion.

7. The apparatus as set forth in claim 3, wherein the second measured-value signal is generated in response to the first detection signal.

8. The apparatus as set forth in claim 3, wherein the first measured-value signal is generated in response to the second detection signal.

9. The apparatus as sat forth in claim 3, further comprising a communication network including the link.

10. The apparatus as set forth in claim 3, further comprising a monitor device, the monitor device comprising the first indication portion, the first detection portion, a first measured-value portion, the second indication portion, the second detection portion, and the second measured-value portion.

11. An apparatus for pinpointing a temporary interruption in a link that extends between a first station and a second station, the temporary interruption limits transmission of signals between the first station and the second station over the link, the apparatus comprising:

first means for awaiting a restoration of the link in the first station and in the second station, the restoration indicated by a digital signal being transmitted between the first station and the second station following said temporary interruption;

second means for observing the restoration of the link in the first station;

third means for observing the restoration of the link in the second station;

fourth means for generating a change signal in the first station a predetermined time after the restoration of the link is observed in the first station in response to the observed restoration of the link in the first station;

fifth means for transmitting the change signal from the first station to the second station over said link;

sixth means for receiving the change signal in the second station; and seventh means for determining the distance between the interruption and the second station in response to the time that the restored link was observed at the second station, and in response to the time that the change signal was received at the second station.

12. The method set forth in claim 11, further comprising the steps of:

eighth means for generating a second change signal in the second station a predetermined time after the restoration of the link is observed in the second station in response to the observed restoration of the link in the second station;

ninth means for transmitting the second change signal from the second station to the first station over said link;

tenth means for receiving the second change signal in the first station; and eleventh means for determining the distance between the interruption and the first station in response to the time that the restored link was observed at the first station, and in response to the time that the change signal was received at the first station.

13. The apparatus set forth in claim 11, wherein the digital signal indicating restoration comprises a plurality of signals.

14. The apparatus set forth in claim 11, wherein the digital signal indicating restoration has a predetermined code.

\* \* \* \* \*